United States Patent
Park et al.

(10) Patent No.: US 9,229,183 B2
(45) Date of Patent: Jan. 5, 2016

(54) MULTI-CHANNEL RECEIVER OPTICAL SUB ASSEMBLY

(71) Applicants: Mi-Ran Park, Daejeon (KR); Jong Sool Jeong, Daejeon (KR); Hyun Soo Kim, Daejeon (KR); Byungseok Choi, Daejeon (KR); Young Tak Han, Daejeon (KR); O-Kyun Kwon, Seoul (KR)

(72) Inventors: Mi-Ran Park, Daejeon (KR); Jong Sool Jeong, Daejeon (KR); Hyun Soo Kim, Daejeon (KR); Byungseok Choi, Daejeon (KR); Young Tak Han, Daejeon (KR); O-Kyun Kwon, Seoul (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 148 days.

(21) Appl. No.: 14/012,384

(22) Filed: Aug. 28, 2013

(65) Prior Publication Data

US 2015/0063832 A1      Mar. 5, 2015

(30) Foreign Application Priority Data

Aug. 28, 2012  (KR) .................. 10-2012-0094258

(51) Int. Cl.
*H04B 10/60*  (2013.01)
*G02B 6/42*   (2006.01)

(52) U.S. Cl.
CPC ............ *G02B 6/4274* (2013.01); *G02B 6/4249* (2013.01); *G02B 6/4263* (2013.01); *G02B 6/4279* (2013.01)

(58) Field of Classification Search
CPC ....................................................... H04B 10/60
USPC ............................................ 398/214; 385/14
See application file for complete search history.

(56) References Cited

U.S. PATENT DOCUMENTS

| | | | |
|---|---|---|---|
| 2004/0033004 A1* | 2/2004 | Welch et al. ................ | 385/14 |
| 2012/0170944 A1* | 7/2012 | Yagisawa et al. ........... | 398/200 |
| 2013/0188963 A1* | 7/2013 | Afriat et al. ................ | 398/135 |

FOREIGN PATENT DOCUMENTS

| | | |
|---|---|---|
| JP | 2001-326377 A | 11/2001 |
| KR | 10-2003-0008424 A | 1/2003 |
| KR | 10-2009-0043197 A | 5/2009 |

* cited by examiner

*Primary Examiner* — Edward Wojciechowicz
(74) *Attorney, Agent, or Firm* — Rabin & Berdo, P.C.

(57) ABSTRACT

Disclosed is a multi-channel receiver optical sub assembly. The a multi-channel receiver optical sub assembly includes: a multi-channel PD array, in which a plurality of photodiodes (PDs) disposed on a first capacitor, and including receiving areas disposed at centers thereof and anode electrode pads arranged in an opposite direction at an angle of 180 degrees based on the receiving areas between the adjacent PDs is monolithically integrated; a plurality of transimpedance amplifiers (TIAs) arranged on a plurality of second capacitors, respectively, and connected with the anode pads of the respective PDs through wire bonding; a submount on which the first capacitor.

14 Claims, 4 Drawing Sheets

(a)

(b)

<PRIOR ART>

(a)

(b)

MULTI-CHANNEL RECEIVER OPTICAL SUB ASSEMBLY

CROSS-REFERENCE TO RELATED APPLICATIONS

This application is based on and claims priority from Korean Patent Application No. 10-2012-0094258, filed on Aug. 28, 2012, with the Korean Intellectual Property Office, the disclosure of which is incorporated herein in its entirety by reference.

TECHNICAL FIELD

The present disclosure relates to a multi-channel receiver optical sub assembly, and more particularly to, a monolithically integrated multi-channel receiver optical sub assembly of an optical transceiver system to which a multi-function high-integrated optical transmission line optical sub module platform for an access network based on a next generation WDM and TDM providing optical Internet services in gigabits or higher is applied.

BACKGROUND

Recently, as a quantity of data transmitted through a network increases according to necessity of mass information exchange, a wavelength division multiplexing (WDM) method has been used in an optical transmission system using a single channel. The WDM method is a data transceiving method of transceiving data of several wavelength ranges through one optical fiber by multiplexing or demultiplexing the data.

Accordingly, a multi-channel transmitter optical sub assembly (TOSA), a multi-channel receiver optical sub assembly (ROSA), and an optical sub assembly (OSA) are demanded as a multi-channel optical transceiver module for data channel multiplexing in an optical transceiver system to which a multi-function high-integrated optical transmission line optical sub module platform for a network based on a WDM is applied.

Especially, in a metro access network system requiring mass data transmission, the development of a technology of the multi-channel ROSA that is an optical receiver with high sensitivity has been demanded according to a long transmission distance. In order to manufacture the ROSA having high sensitivity, it is necessary to use a photodiode (hereinafter, referred to as a "PD") having a high sensitivity characteristic. However, it is more difficult to manufacture the ROSA having high sensitivity in which the PDs are integrated, compared to the ROSA in which PIN PDs are integrated in the related art.

FIGS. 1A and 1B are a diagram illustrating a configuration of a ROSA in which a single-channel PD is integrated in the related art and a circuit diagram corresponding to the configuration, respectively.

Referring to FIGS. 1A and 1B, the ROSA in the related art includes a PD 110, two bypass capacitors 120 and a transimpedance amplifier (TIA) 130.

In order to manufacture the ROSA having the best sensitivity, the PD needs to exhibit high sensitivity, and the sensitivity of the PD may be measured and evaluated when the ROSA is manufactured in a form of a transistor outline (TO) in which the two bypass capacitors 120 and the transimpedance amplifier 130 are integrated as illustrated in FIG. 1. Accordingly, the sensitivity of the ROSA in which the PD is integrated may be determined by an optimal arrangement of the PD 110, the two bypass capacitors 120 and the transimpedance amplifier 130, and a wire bonding method.

The transimpedance amplifier mounted for the optimal arrangement of the respective components of the ROSA needs to meet a capacitance of the PD demanded for an optimum operation, and also meet a capacitance of the bypass capacitor. Further, when a length of the wire for the wire bonding increases, inductance increases, so that it is necessary to arrange the respective components considering the inductance so as to optimally perform the wire bonding.

As described above, in order to manufacture the ROSA, it is necessary to consider several factors. In order to meet the consideration, sizes of the three types of components, such as the PD, the two bypass capacitors and the transimpedance amplifier, the arrangement for the mounting and an electrode design are important. In the three types of components, a size of the currently commercially available transimpedance amplifier and a size of the capacitor of optimal capacity are larger two and three times than that of the PD. However, when a size of the PD increases, the capacitance of the PD increases and a chip price is increased, so that it is impossible to increase a chip size of the PD to correspond to the sizes of the transimpendance amplifier and the capacitor in order to achieve the optimal wire bonding for preventing the deterioration of the sensitivity. Accordingly, a shape of the ROSA to be manufactured is determined according to the sizes of the transimpendance amplifier and the capacitor and an arrangement form of electrode pads of the PD.

Further, in order to manufacture the ROSA in which a plurality of PDs is integrated, since there is no commercially available multi-channel transimpedance amplifier, it is necessary to integrate the transimpedance amplifiers and the capacitors as many as the number of channels. Accordingly, it is difficult to manufacture the ROSA in which the plurality of PDs having a high sensitivity characteristic is integrated, and a sub module platform in which the ROSA in which single-channel PDs are integrated as many as the number of channels has been developed up to now.

SUMMARY

The present disclosure has been made in an effort to provide a multi-channel receiver optical sub assembly with multi-functions, high performance, less power, a small size and a low price.

An exemplary embodiment of the present disclosure provides a multi-channel receiver optical sub assembly, including: a multi-channel PD array, in which a plurality of photodiodes (PDs) disposed on a first capacitor, and including receiving areas disposed at centers thereof and anode electrode pads arranged in an opposite direction at an angle of 180 degrees based on the receiving areas between the adjacent PDs is monolithically integrated; a plurality of transimpedance amplifiers (TIAs) arranged on a plurality of second capacitors, respectively, and connected with the anode pads of the respective PDs through wire bonding; a submount on which the first capacitor, the plurality of second capacitors and a plurality of transmission lines are mounted; and a transistor outline (TO, i.e., the TO can of a ROSA) on which the submount is mounted, the transistor outline including a plurality of pins including power pins for supplying a power voltage to the plurality of PDs and the plurality of TIAs through the plurality of transmission lines, a ground pin for supplying a ground voltage to the plurality of TIAs, and output pins for outputting signals of the plurality of TIAs.

Another exemplary embodiment of the present disclosure provides a two-channel receiver optical sub assembly, including: a two-channel PD array in which two photodiodes (PDs) disposed on a first capacitor, and including receiving areas disposed at centers thereof and anode electrode pads arranged in an opposite direction at an angle of 180 degrees based on the receiving areas between the adjacent PDs is monolithically integrated; two transimpedance amplifiers (TIAs) arranged on two second capacitors, respectively, and connected with the anode pads of the respective PDs through wire bonding; and a transistor outline (TO) in which the first capacitor and the two second capacitors are mounted, the transistor outline (TO) including a plurality of pins including power pins for supplying a power voltage to the two PDs and the two TIAs, a ground pin for supplying a ground voltage to the two TIAs, and output pins for outputting signals of the two TIAs.

According to the exemplary embodiments of the present disclosure, by providing the receiver optical sub assembly in which a plurality of PDs is monolithically integrated, it is possible to configure the PDs having the desired number of channels according to necessity of a user.

Further, by providing the multi-channel receiver optical sub assembly in which the PDs are integrated on the TO having the small number of pins, it is possible to manufacture a multi-channel receiver optical sub assembly having characteristics of multi-functions, high performance, less power and a small size with a low price.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

In the present disclosure, an anode pad of a photodiode (hereinafter, referred to as a "PD") is differently designed from that of the related art, a capacitor and a transimpedance amplifier (hereinafter, referred to as a "TIA") integrated in a multi-channel receiver optical sub assembly (hereinafter, referred to as a "ROSA") are newly arranged, and a capacitor connected to power voltages of the PD and the TIA is commonly designed.

Further, in the present disclosure, a two-channel ROSA and a four-channel ROSA are described as examples for the convenience of description, but the present disclosure is not limited thereto, and the multi-channel ROSA may be a ROSA with two channels, four channels, six channels, eight channels and the like.

Figure 1:
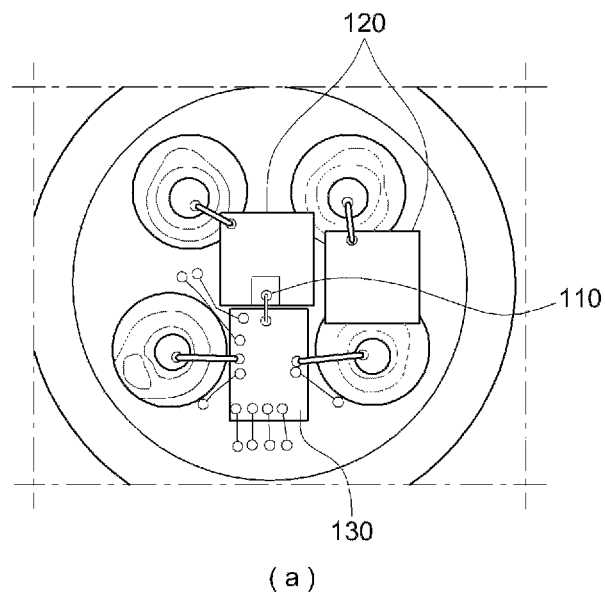
FIGS. 1A and 1B are a diagram illustrating a configuration of a ROSA in which single-channel PDs are integrated in the related art and a circuit diagram corresponding to the configuration.
Figure 1:
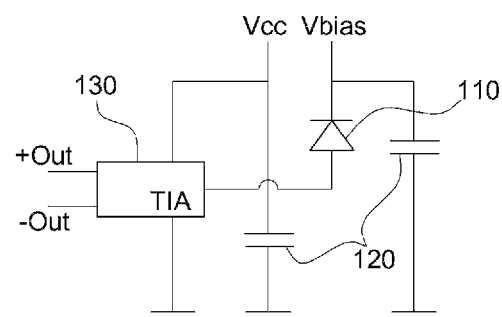
Figure 2:
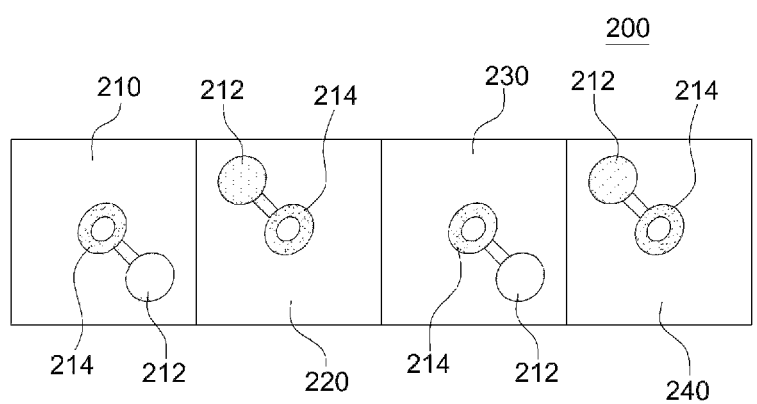
FIG. 2 is a diagram illustrating a configuration of a monolithic integrated four-channel PD array according to an exemplary embodiment of the present disclosure.

FIG. 2 is a diagram illustrating a configuration of a monolithic integrated four-channel PD array according to an exemplary embodiment of the present disclosure.

Referring to FIG. 2, the four-channel PD array 200 may be manufactured by performing once an entire device manufacturing process on the same epitaxial wafer. Accordingly, a manufacturer may manufacture a PD array with two channels, four channels, six channels, eight channels and the like by dicing the epitaxial wafer into the desired number of channels without an additional process or cost.

Anode pads of adjacent PDs, for example, anode pads 212 of a first PD 210 and a second PD 220, in the four-channel PD array 200 according to the present disclosure are arranged in an opposite direction at an angle of 180 degrees with respect to receiving areas 214 so that the TIA is easily integrated with the capacitor. Further, when a size of a separate element is 500×500 $\mu m^2$, an interval between the the receiving areas of the PDs, for example, the receiving area 214 of the first PD 210 and the receiving area 214 of a third PD 230, having the anode pads in the same direction, is 1 mm, so that a separate TIA may be mounted in each channel.

Further, As a length of wire bonding between the anode pads 212 of the PDs 210, 220, 230 and 240 through which photo currents exerting the largest influence on sensitivity of the ROSA and the TIA is short, the anode pads 212 of the PDs 210, 220, 230 and 240 are arranged at inclined angle of 45 degrees with respect to the receiving areas 214.

In addition, the receiving areas 214 are arranged at centers of the PDs 210, 220, 230 and 240 so that optical coupling of a lens array and an optical fiber array may be easily performed when packaging the ROSA. Here, an interval of the receiving areas of the adjacent PDs, for example, the receiving areas 214 of the first PD 210 and the second PD 220, may be 125 $\mu m$, 250 $\mu m$ or 500 $\mu m$.

FIGS. 3A and 3B are a diagram illustrating a configuration of a four-channel ROSA according to an exemplary embodiment of the present disclosure and a circuit diagram corresponding to the configuration.

Figure 3:
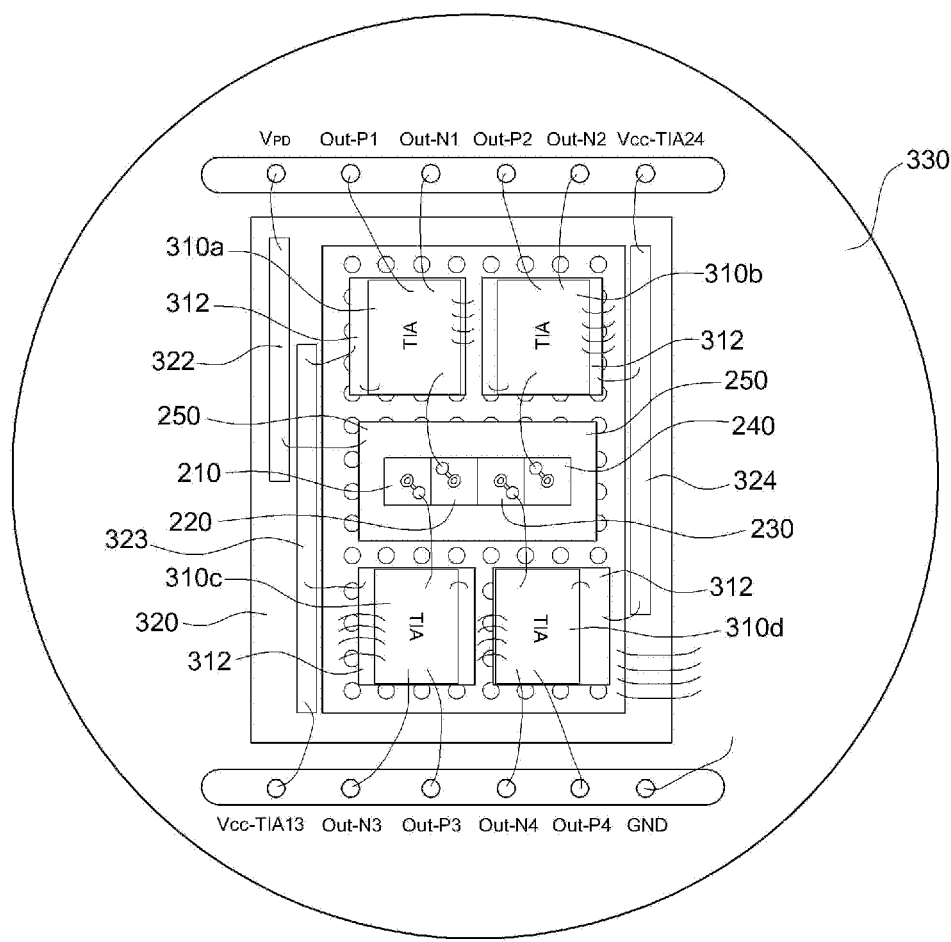
FIGS. 3A and 3B are a diagram illustrating a configuration of a four-channel ROSA according to an exemplary embodiment of the present disclosure and a circuit diagram corresponding to the configuration.
Figure 3:
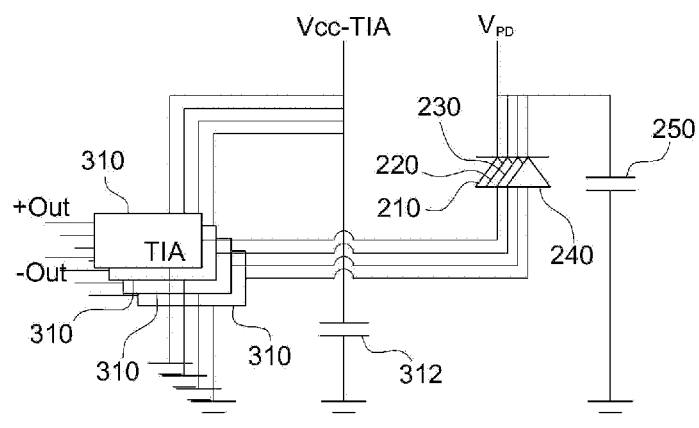

Referring to FIG. 3, the four-channel ROSA according to an exemplary embodiment of the present disclosure includes the four-channel PD array 200 of FIG. 2, four TIAs 310a, 310b, 310c and 310d, a submount 320 and a transistor outline 330.

The four-channel PD array 220, that is, the four PDs 210, 220, 230 and 240, are arranged on a first capacitor 250. Here, the first capacitor 250 is disposed on the submount 320.

The four TIAs 310a, 310b, 310c and 310d are arranged on four second capacitors 312, respectively, and are connected with the anode pads 212 of the four PDs 210, 220, 230 and 240 through wire bonding, respectively. Here, the four second capacitors 312 are arranged on the submount 320 similarly to the first capacitor 250.

The submount 320 is mounted on the TO 330, and includes transmission lines 322, 323 and 324, which are paths for supplying a power voltage to each of the four PDs 210, 220, 230 and 240 and the four TIAs 310a, 310b, 310c and 310d, as well as the first capacitor 250 and the four second capacitors 312.

The TO 330 may be shaped like a circle or a quadrangle, and includes 12 pins $V_{PD}$, Out-P1, Out-N1, Out-P2, Out-N2, Vcc-TIA24, Vcc-TIA13, Out-N3, Out-P3, Out-N4, Out-P4 and GND. Here, the 12 pins $V_{PD}$, Out-P1, Out-N1, Out-P2, Out-N2, Vcc-TIA24, Vcc-TIA13, Out-N3, Out-P3, Out-N4, Out-P4 and GND are arranged at both sides of the submount 320 in groups each of which includes six pins. When the ROSA has N channels, the TO 330 may have (2N+4) pins, and the (2N+4) pins may be divided into groups, each of which includes (2n+4)/2 pins, and arranged at both sides of the submount 320.

The 12 pins $V_{PD}$, Out-P1, Out-N1, Out-P2, Out-N2, Vcc-TIA24, Vcc-TIA13, Out-N3, Out-P3, Out-N4, Out-P4 and GND include power pins $V_{PD}$, Vcc-TIA24 and Vcc-TIA13 for supplying a power voltage to the four PDs 210, 220, 230 and 240 and the four TIAs 310a, 310b, 310c and 310d, output pins Out-P1, Out-N1, Out-P2, Out-N2, Out-P3, Out-N3, Out-P4 and Out-N4 for outputting signals of the four TIAs 310a, 310b, 310c and 310d, and a ground pin GND for supplying a ground voltage to the four TIAs 310a, 310b, 310c and 310d.

Accordingly, cathode pads (not illustrated) of the four PDs 210, 220, 230 and 240 are commonly connected to the power pin $V_{PD}$ through the first capacitor 250.

Further, when it is assumed that the TIAs symmetrically positioned based on the four-channel PD array 200, that is, the two TIAs positioned at a left side based on the four-channel PD array 200 in FIG. 3, are referred to as first TIAs 310a and 310c, and the two TIAs positioned at a right side based on the four-channel PD array 200 are referred to as second TIAs 310b and 310d, anode pads of the first TIAs 310a and 310c are commonly connected to the power pin Vcc-TIA13 through the second capacitor 312, and anode pads of the second TIAs 310b and 310d are commonly connected to the power pin Vcc-TIA24 through the second capacitor 312. Accordingly, the four-channel ROSA according to the present disclosure has the two power pins for inputting a power voltage to the four TIAs 310a, 310b, 310c and 310d.

Further, ground electrode pads of the four TIAs 310a, 310b, 310c and 310d are commonly connected to the ground pin GND through the submount 320.

As described above, the four-channel ROSA according to the present disclosure is manufactured based on a TO module, so that it is possible to manufacture the multi-channel ROSA with a low price, multi-functions, high performance, less power and a small size.

Figure 4:
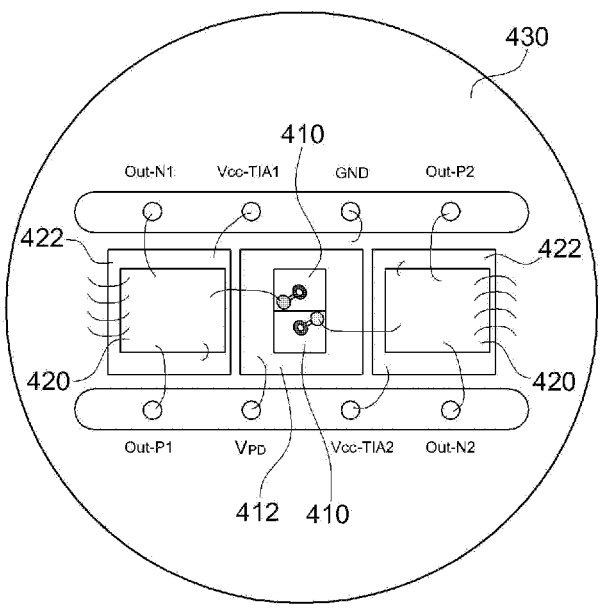
FIG. 4 is a diagram illustrating a configuration of a two-channel ROSA according to another exemplary embodiment of the present disclosure.

FIG. 4 is a diagram illustrating a configuration of a two-channel ROSA according to another exemplary embodiment of the present disclosure.

Referring to FIG. 4, the two-channel ROSA according to another exemplary embodiment of the present disclosure does not include the submount, contrary to the four-channel ROSA of FIG. 3, but includes two PDs 410, two TIAs 420, and a TO 430. Accordingly, in the TO 430 according to the present disclosure, all DC power is directly connected to a pin of the TO 430. That is, a total of eight pins $V_{PD}$, Out-P1, Out-N1$_{9\ Out-P2}$, Out-N2, Vcc-TIA1, Vcc-TIA2 and GND are integrated on the TO 430.

A configuration of each of the two PDs 410 is the same as the configuration of each of the four PDs 210, 220, 230 and 240 of FIG. 2, and the two PDs 410 are arranged on the first capacitor 412. Here, the first capacitor 412 is disposed on the TO 430.

The two TIAs 420 are arranged on two second capacitors 422, respectively. Here, the two second capacitors 422 are arranged on the TO 430 similarly to the first capacitor 412.

The TO 430 may be shaped like a circle or a quadrangle, and includes eight pins $V_{PD}$, Out-P1, Out-N1, Out-P2, Out-N2, Vcc-TIA1, Vcc-TIA2 and GND. Here, the eight pins $V_{PD}$, Out-P1, Out-N1, Out-P2, Out-N2, Vcc-TIA1, Vcc-TIA2 and GND are arranged in groups, each of which includes four pins, at both sides with the two PDs 410 and the two TIAs 420 interposed therebetween.

The eight pins $V_{PD}$, Out-P1, Out-N1, Out-P2, Out-N2, Vcc-TIA1, Vcc-TIA2 and GND include power pins $V_{PD}$, Vcc-TIA1 and Vcc-TIA2 for supplying a power voltage to the two PDs 410 and the two TIAs 420, output pins Out-P1, Out-N1, Out-P2 and Out-N2 for outputting signals of two TIAs 420, and a ground pin GND for supplying a ground voltage to the two TIAs 420.

Accordingly, cathode pads (not illustrated) of the two PDs 410 are commonly connected to the power pin $V_{PD}$ through the first capacitor 412.

Further, ground electrode pads of the two TIAs 420 are commonly connected to the ground pin GND through the TO 430.

Figure 5:
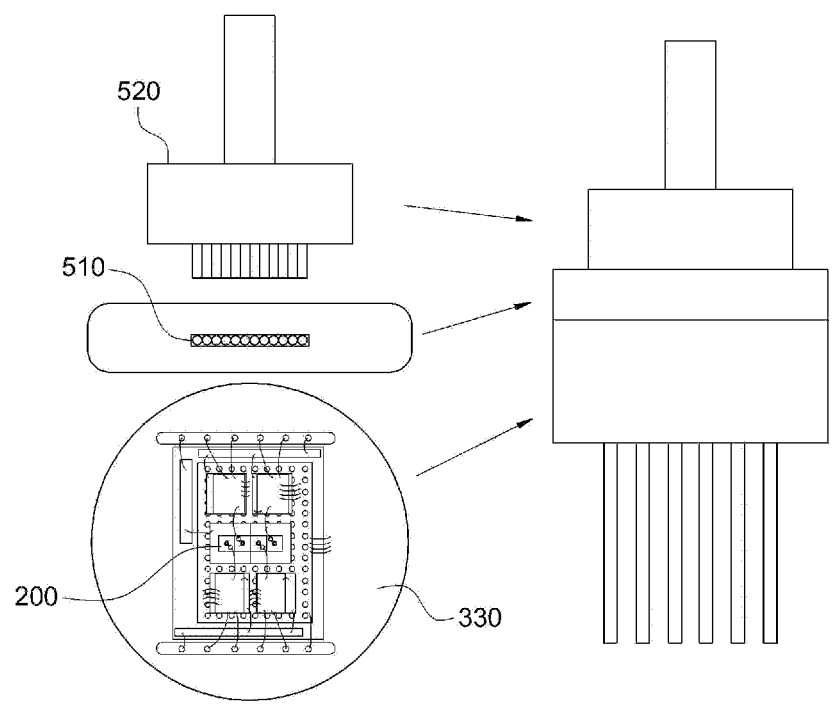
FIG. 5 is a diagram for describing a method of packaging a four-channel ROSA according to an exemplary embodiment of the present disclosure.

FIG. 5 is a diagram for describing a method of packaging a four-channel ROSA according to an exemplary embodiment of the present disclosure.

Referring to FIG. 5, the four-channel ROSA according to the exemplary embodiment of the present disclosure is manufactured by optical-coupling and packaging the four-channel PD array 200 integrated on the TO 330, a lens array 510 and an optical fiber array 520.

From the foregoing, it will be appreciated that various embodiments of the present disclosure have been described herein for purposes of illustration, and that various modifications may be made without departing from the scope and spirit of the present disclosure. Accordingly, various embodiments disclosed herein are not intended to be limiting, with the true scope and spirit being indicated by the following claims.

What is claimed is:

1. A multi-channel receiver optical sub assembly, comprising:
   a transistor outline (TO) can;
   a submount mounted on the TO can, the submount having a first capacitor, a plurality of second capacitors and a plurality of transmission lines mounted thereon;
   a multi-channel photodiode (PD) array, including a plurality of PDs, formed on the first capacitor, each PD including a receiving area at a center thereof for receiving optical signals, and an anode pad connected to the receiving area along a predetermined direction, two predetermined directions along which the anode pads of any adjacent two of the PDs are respectively connected to their corresponding receiving areas being opposite to each other; and
   a plurality of transimpedance amplifiers (TIAs) respectively arranged on the plurality of second capacitors, each TIA being connected with the anode pad of one of the PDs through wire bonding,
   wherein the TO can has a plurality of pins including
      a plurality of power pins for supplying a power voltage to the plurality of PDs and the plurality of TIAs through the plurality of transmission lines,
      a ground pin for supplying a ground voltage to the plurality of TIAs, and
      a plurality of output pins for outputting signals of the plurality of TIAs.

2. The multi-channel receiver optical sub assembly of claim 1, wherein an interval between any adjacent two of the receiving areas in the multi-channel PD array is 125 µm, 250 µm or 500 µm.

3. The multi-channel receiver optical sub assembly of claim 1, wherein the plurality of PDs have a plurality of cathode pads commonly connected to one of the plurality of power pins through the first capacitor.

4. The multi-channel receiver optical sub assembly of claim 1, wherein the TIAs have a plurality of anode pads that are arranged on symmetric positions and are commonly connected to one of the plurality of power pins through one of the second capacitors.

5. The multi-channel receiver optical sub assembly of claim 1, wherein the TIAs have a plurality of ground electrode pads commonly connected to the ground pin through the submount.

6. The multi-channel receiver optical sub assembly of claim 1, wherein
the multi-channel receiver optical sub assembly is an N-channel receiver optical sub assembly, and
the number of the plurality of pins is (2N+4), N being a natural number.

7. The multi-channel receiver optical sub assembly of claim 6, wherein
the plurality of pins are divided into two groups, each of which includes (2N+4)/2 pins, the two groups being respectively arranged at two sides of the submount, and
the multi-channel PD array, the plurality of TIAs, the first capacitor and the plurality of second capacitors are arranged between the pins arranged at the two sides.

8. The multi-channel receiver optical sub assembly of claim 1, wherein the TO can has a shape of a circle or a quadrangle.

9. A two-channel receiver optical sub assembly, comprising:
a transistor outline (TO) can having a first capacitor and two second capacitors mounted thereon;
a two-channel photodiode PD array, including two photodiodes PDs, formed on the first capacitor, each PD includes a receiving area at a center thereof for receiving optical signals, and an anode pad connected to the receiving area along a predetermined direction, the two predetermined directions along which the anode pads of the two PDs are respectively connected to their corresponding receiving areas being opposite to each other; and
two transimpedance amplifiers (TIAs) respectively arranged on the two second capacitors, and respectively connected with the anode pads of the two PDs through wire bonding;
wherein the TO can has a plurality of pins including
a plurality of power pins for supplying a power voltage to the two PDs and the two TIAs,
a ground pin for supplying a ground voltage to the two TIAs, and
a plurality of output pins for outputting signals of the two TIAs.

10. The two-channel receiver optical sub assembly of claim 9, wherein an interval between the receiving areas of the two PDs in the two-channel PD array is 125 µm, 250 µm or 500 µm.

11. The two-channel receiver optical sub assembly of claim 9, wherein
each PD has a cathode pad, and
the cathode pads of the two PDs are commonly connected to one of the plurality of power pins through the first capacitor.

12. The two-channel receiver optical sub assembly of claim 9, wherein the two TIAs have a plurality of ground electrode pads commonly connected to the ground pin through the TO.

13. The two-channel receiver optical sub assembly of claim 9, wherein the TO can has a shape of a circle or a quadrangle.

14. A multi-channel receiver optical sub assembly, comprising:
a transistor outline (TO) can;
a submount mounted on the TO can, the submount having a first capacitor, a plurality of second capacitors and a plurality of transmission lines mounted thereon;
a multi-channel photodiode (PD) array, including a plurality of PDs, formed on the first capacitor, each PD including a receiving area at a center thereof for receiving optical signals, and an anode pad connected to the receiving area along a predetermined direction, two predetermined directions along which the anode pads of any adjacent two of the PDs are respectively connected to their corresponding receiving areas being opposite to each other; and
a plurality of transimpedance amplifiers (TIAs) respectively arranged on the plurality of second capacitors, each TIA being connected with the anode pad of one of the PDs through wire bonding,
wherein the TO can has a plurality of pins including
a plurality of power pins for supplying a power voltage to the plurality of PDs and the plurality of TIAs through the plurality of transmission lines,
a ground pin for supplying a ground voltage to the plurality of TIAs, and
a plurality of output pins for outputting signals of the plurality of TIAs, and
wherein each of the anode pads is arranged at inclined angle of 45 degrees with respect to the receiving areas.

* * * * *